June 1, 1965

B. A. CURRY 3,186,293

T-BOLT

Filed Sept. 14, 1962

INVENTOR.
B. A. CURRY

BY

ATTORNEY

# United States Patent Office 3,186,293
Patented June 1, 1965

3,186,293
T-BOLT
Bernard A. Curry, 1924 N. Michigan, Davenport, Iowa
Filed Sept. 14, 1962, Ser. No. 223,770
2 Claims. (Cl. 85—9)

This invention relates to a fastener of the T-bolt type which has its principal utility in the assembly of components having fastener-receiving slots therein.

One example of a particularly advantageous use of this novel fastener is the attachment of license plates to vehicles. In the usual type of fastener, insertion of the bolt must be made from beneath and behind the bumper and despite the use of rust-proof plating etc., it is very often necessary to use one tool on the bolt head behind the bumper and another tool on the nut ahead of the plate, all of which makes it an unpleasant task.

According to the present invention, these disadvantages are eliminated by a T-bolt which can be installed entirely from the front, making it unnecessary to reach beneath and behind the bumper. The threaded shank of the T-bolt has a polygonal head rigid thereon which can be held with one tool from in front while the nut, threaded onto the shank between the head and cross bar of the T-bolt can be manipulated with another wrench, also in front of the plate. An appropriate mark on the head tells the user whether the cross bar is parallel to or crosswise of the slot.

The foregoing and other important objects and desirable features inherent in and encompassed by the invention will become apparent to those versed in the art as a preferred embodiment of the invention is described in detail in the ensuing description and accompanying sheet of drawings, the figures of which are described below.

Figure 1:
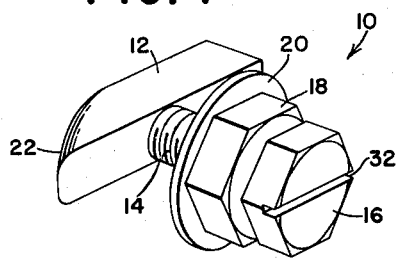
FIGURE 1 is a perspective of the T-bolt assembly, shown at approximately twice the size that would be used for the attachment of vehicle license plates, for example.

The T-bolt, designated as a whole at 10, is preferably of rust-proof plated metal and has a cross bar 12, an externally threaded shank 14, a head 16, a nut 18 and a washer 20. The shank is rigid with and perpendicular to the cross bar and projects outwardly to an outer or front terminal end constituted by the head 16, which is also rigid with the shank. The head is of a regular polygonal shape, here a hexagon, coaxial with the shank and adapted to receive a typical wrench.

The nut 18 is also preferably a hexagon, larger than the head and is threaded onto the shank before the shank is united to the cross bar (or before the head is united to the shank). Likewise, the washer is pre-installed. This provides a unit assembly including all the components needed. Obviously, a lock washer could be preliminarily added or substituted for the washer 20.

Figure 5:
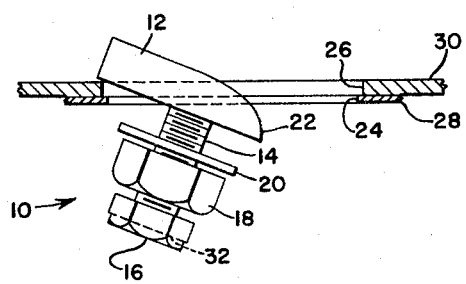
FIGURE 5 is a plan view, partly in section, showing the insertion of the T-bolt.

One end of the cross bar 12 is tapered or of reduced dimension, as at 22 which, as shown in FIGURE 5, slips easily through even partially registered slots and facilitates insertion of the T-bolt through such slots as those shown at 24 and 26, for example, of a vehicle license plate 28 and bumper 30.

Figure 2:
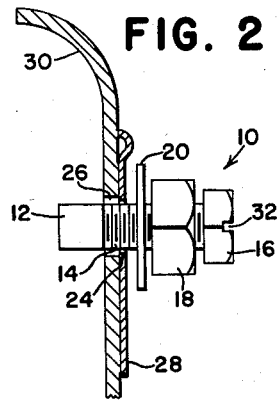
FIGURE 2 is a section, somewhat reduced from the scale of FIGURE 1, showing a preliminary phase of installation.
Figure 3:
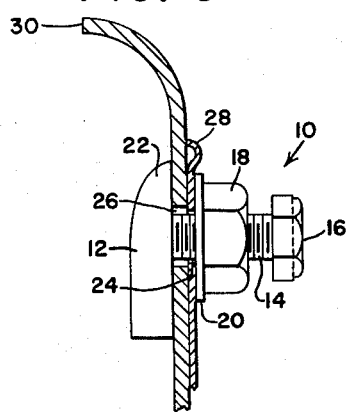
FIGURE 3 shows the final phase of installation.
Figure 4:
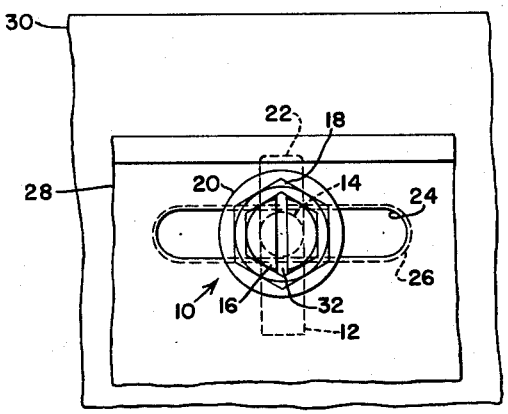
FIGURE 4 is a front view of the installation of FIGURE 3.

In assembly, the nut 18 is backed off toward the head 16, the washer is moved back toward the nut and the cross bar 12 is inserted through the alined slots 24 and 26 (FIGURES 2 and 5), the user operating entirely from the front. When the cross bar is entirely behind the bumper 30, or its equivalent (FIGURE 2), the T-bolt may be turned 90° simply by turning the head 16, which may be indicated to the user by a mark, such as a screwdriver slot 32, across the front radial face of the head 16, since this mark is indexed with the cross bar by being alined therewith.

The nut may now be spun into finger-tightness. For final tightening two wrenches may be employed. Since the head 16 is smaller than the nut, a box wrench of the correct size will pass the head and fit the nut. A second and smaller wrench, fitting the head, will enable the user to finish the job quickly and easily. Of course, a screwdriver could be used in the head slot 32 if desired. Disassembly involves merely reversing the foregoing.

It will thus be seen that a simple and inexpensive fastener has been provided, one that eliminates the nuisance of attachment and detachment of license plates for example. Features and advantages other than those enumerated will readily occur to those versed in the art, as will alterations in the preferred embodiment disclosed, all without departure from the spirit and scope of the invention.

What is claimed is:

1. A T-bolt, comprising: a cross bar; a cylindrical, externally threaded shank rigidly secured at one end to an intermediate portion of said cross bar and extending perpendicularly therefrom to an outer terminal end; a head rigid on said terminal end and shaped as a regular polygon coaxial with and of a diametrical dimension greater than said shank and adapted to receive a wrench; a nut threadedly carried by the shank between said head and cross bar and confined against axial removal from the shank by said head and cross bar and shaped as a regular polygon on the axis of said shank and adapted to receive a wrench, the major radial dimension of the nut being greater than that of the head.

2. The invention defined in claim 1, in which: the polygonal shapes of the head and nut are the same.

References Cited by the Examiner
UNITED STATES PATENTS

| | | | |
|---|---|---|---|
| 782,366 | 2/05 | Stroud | 151—69 |
| 1,187,430 | 6/16 | Kenly | 151—09 |
| 1,296,275 | 3/19 | Firth. | |
| 1,789,126 | 1/31 | Aldeen | 85—9 |
| 2,099,116 | 11/37 | Kalmback. | |
| 2,409,666 | 10/46 | Comey | 85—9 |

EDWARD C. ALLEN, Primary Examiner.